No. 727,997. PATENTED MAY 12, 1903.
F. E. PARKER.
ORE SEPARATING AND CONCENTRATING APPARATUS.
APPLICATION FILED NOV. 11, 1901.
NO MODEL. 5 SHEETS—SHEET 1.

Fig. 1.

Witnesses:
Inventor.

No. 727,997. PATENTED MAY 12, 1903.
F. E. PARKER.
ORE SEPARATING AND CONCENTRATING APPARATUS.
APPLICATION FILED NOV. 11, 1901.
NO MODEL. 5 SHEETS—SHEET 4.

Witnesses:
Edwin A. Eggleston
Chas. N. Manning

Inventor
Francis E. Parker
By Rich. H. Manning
Atty

No. 727,997. PATENTED MAY 12, 1903.
F. E. PARKER.
ORE SEPARATING AND CONCENTRATING APPARATUS.
APPLICATION FILED NOV. 11, 1901.
NO MODEL. 5 SHEETS—SHEET 5.

No. 727,997. Patented May 12, 1903.

UNITED STATES PATENT OFFICE.

FRANCIS E. PARKER, OF KANSAS CITY, MISSOURI, ASSIGNOR TO U. S. ORE REDUCTION COMPANY, A CORPORATION OF COLORADO.

ORE SEPARATING AND CONCENTRATING APPARATUS.

SPECIFICATION forming part of Letters Patent No. 727,997, dated May 12, 1903.

Application filed November 11, 1901. Serial No. 81,862. (No model.)

*To all whom it may concern:*

Be it known that I, FRANCIS E. PARKER, a citizen of the United States of America, residing at Kansas City, in the county of Jackson and State of Missouri, have invented certain new and useful Improvements in Ore Separating and Concentrating Apparatus; and I do hereby declare that the following is a full, clear, and exact description of the invention, such as will enable others to make and use the same, reference being had to the accompanying drawing, forming a part of this specification.

The objects of my invention are, first, the separation and concentration of the metals from the extraneous substances or slimes of milled or comminuted ores rapidly and economically and in a condition for reduction at a minimum expense, and thus save in the cost of transportation and the further treating of all worthless material; second, the manipulation of milled ores for economic irrigation of the waste material; third, to concentrate the metals during the irrigation of the material; fourth, to disperse the waste material and slimes from moving deposits of the comminuted ores automatically.

The invention consists in the novel construction and combination of parts, such as will be first fully described and then specifically pointed out in the claims.

In the drawings, Fig. 8 is a broken detail view in perspective of part of the concentrating-table on the movable table on the track-rails, showing the vibrating upright plates and the rod upon which they are hinged. Fig. 9 is a detail view, partially broken away, of the rear side of the stationary main receptacle, showing the perforate irrigating water-pipes. Fig. 10 is a broken vertical sectional view in detail of the conveyer box or trough, showing the conveyer and the feed-regulating plate and its adjusting devices. Fig. 10$^a$ is a vertical sectional view taken upon the line $x$ $x$ of Fig. 10. Fig. 11 is a broken longitudinal sectional view of the opposite ends of the lower portion of the main elevated receptacle and the vibrating trough or sifter, showing the feed-regulating plates thereon and the adjusting devices. Fig. 12 is a detail view in perspective of one of the automatically-operated scrapers and frame upon its supporting-shaft, also showing one of the hanging beams and the guide-pulleys for the operating-cable.

Similar letters of reference indicate corresponding parts in all the figures of the drawings.

Referring to the drawings, A represents the floor of a building in which the separation and concentration of the metals is conducted, and which building is preferably erected near the shaft of the mine so that the handling of the ore is without unnecessary expense. The building may also contain the usual stamping or roller mills for pulverizing ores, if preferred, the ore for the separation of my invention being first reduced to sufficient fineness to liberate the valuable portions from foreign substances by the ordinary stamping or crushing rollers.

Upon the surface of the floor A are laid in a parallel position the track-rails B B of the proper length for the reciprocal movement of the table between the respective forward and rear ends $b$ $b'$.

B' is a guide-rail upon floor A intermediate the rails B B, in the upper surface of which is a longitudinal groove $b^2$.

C represents the reciprocating table for the separation of the slimes from the metals, which is supported movably by the flanged wheels D D beneath the table, said wheels being mounted on the track-rails B B.

$d$ $d$ are the axles to the wheels D D on the parallel track-rails B B, which axles extend beneath the opposite ends of the table, the table being directly supported by the longitudinally-extended stringers or beams $c$ $c$ on the under side of the table, upon the under side of which beams are the journal-boxes $d^2$ $d^2$ to receive the axles $d$ $d$. Upon each axle $d$ $d$, between the flanged wheels B B, is a guide-wheel E, upon the periphery of which is an annular flange $e$, which extends within the groove $b^2$ of the guide-rail B' and prevents vibration laterally of the table.

Figures 4, 5, 6, 7:
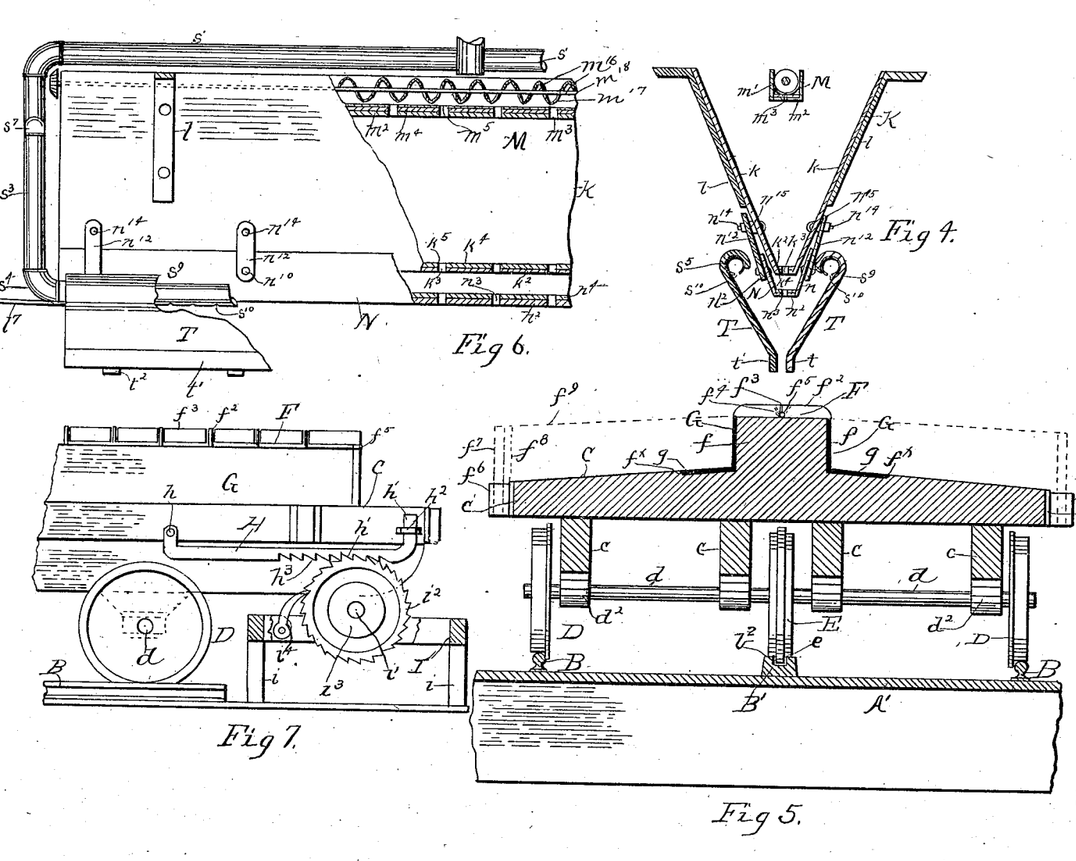
Fig. 4 is a detail vertical sectional view of the elevated material-distributing and irrigating devices, taken upon the line $x$ $x$ of Fig. 3.
Fig. 5 is a vertical sectional view of the reciprocating table, taken upon the line $y$ $y$ of Fig. 2.
Fig. 6 is a detail broken side view of the forward end of the stationary and vibrating elevated material-feeding receptacle-troughs for the milled ore, showing a portion of the longitudinal screw conveyer in the stationary trough, the perforate bottom to the stationary and vibrating troughs, and the perforate sliding and feed-regulating plates, the irrigating-pipes and the deflecting-plates for the irrigating material supported by the said pipes.
Fig. 7 is a detail broken side view of one end of the reciprocating table, showing the pivoted rack on the edge of the table, the stationary frame at one end of the track-rails at the limit of movement of the table at the end of the track-rails, the drum journaled in the frame for the cable actuating the scrapers, and the ratchet-wheel and pawl at one end of the drum, the ratchet-wheel being shown engaged by the rack on the side of the movable table.

The longitudinal edges $c'$ $c'$ of the sides of table C extend to a short distance beyond the vertical line of the flange-wheels D D, and upon the upper surface of said table, equidistant from said edges, is an elevated longitudinally-extended concentrating-table F, which consists of a beam rectangular in cross-section extending a short distance in height above the surface of table C, the upper surface of which is narrow in width and receives the deposit of the irrigated metals and slimes. The longitudinal sides $ff$ of the table F extend downwardly to the surface of the table C on vertical lines, as seen in Fig. 5, the ends of the table F extending to within a short distance of the respective forward and rear ends $e^2$ $e^3$ of table C. From the sides $ff$ of table F the upper surface of the table C is inclined downwardly to the outer edges $c'$ $c'$ of said table in slight degree, the angle of inclination being such as to afford an easy gradient for the irrigated slimes.

Upon the sides $ff$ of table F are amalgamating-plates G G, which extend the length of said sides and from the outer edges of table F downwardly to the upper surface of table C and are bent at an angle, and a portion $g$, extended from the sides $ff$ outwardly and within the depression $f$, extending a short distance below the plane of the surface of table C. These plates G G are preferably made from copper and covered with amalgam upon their outer surfaces.

Upon the upper surface of the table F are a series of transversely-disposed upright plates $f^2$, which are fixedly connected with the table and arranged in position a short distance apart in the longitudinal direction of table F. Between contiguous plates $f^2$ $f^2$ in the series of plates are the material-dispersing pivoted plates $f^3$. These plates are located at a point equidistant from the vertical sides $ff$ of the table F and extend in the longitudinal direction of said table and from the inner side of one plate nearly to the side of a contiguous plate and corresponding in height with that of plates $f^2$. Upon the lower edge of each one of the plates $f^3$ is an eye $f^4$, and extending through said eyes and the sides of the series of upright plates $f^2$ in the longitudinal direction of and a slight distance above the surface of table F is a stationary rod $f^5$, as seen in detail in Fig. 8.

Upon the longitudinal edges of the table C and also at each end $c^2$ $c^3$ of the table are the socket-plates $f^6$, which receive the posts $f^7$, connected with the removable sides and ends $f^9$ $f^9$ to said table, which are shown in dotted lines in position in Fig. 5, and which are temporarily employed when the table is receiving the irrigated deposits of the comminuted ores.

Upon the longitudinal edge $c'$ of table C in the direction of the rear end $c^3$ is pivoted at $h$ the upwardly-bent rear end of a rack H, the other end of which rack extends nearly to the line of the end $c^3$ of table C, and its vibrating end $h'$ is bent at right angles and extended upwardly within the guide-loop $h^2$ on the longitudinal edge of the table, so as to move freely in said loop. The teeth $h^3$ of the rack are saw-teeth inclined forwardly at angles to the bar H, so as to release the bar from the ratchet-wheel hereinafter described in the forward movement of the table C.

Upon the floor A, upon one side of and near the rear ends $b'$ of the outer one of the track-rails B B, is a rectangular shaft-supporting frame I, which is supported by the legs $i$ $i$, upon which is journaled in a transverse direction to the line of the track-rails B a shaft $i'$. The frame I in height is approximate to that of the axles $d$, supporting the movable table C, and upon the end of shaft $i'$ near the inner end of frame I is a ratchet-wheel $i^2$, which is arranged upon said shaft so as to come into contact with and be actuated by the teeth $h^3$ on the rack H when the table C is near the rear ends $b'$ of the track-rails B B. Upon the shaft $i'$ in the direction of the outer end of frame I is a drum $i^3$. In the direction of the forward side and upon the inner end of frame I, opposite the ratchet-wheel $i^2$, is a pawl $i^4$, which extends upwardly and engages with said wheel.

Upon the opposite side of the track-rails B B and near the forward ends $b$ of the inner one of the track-rails B is a frame I' of precisely the same construction as frame I, upon which is a transverse shaft $i^5$, and upon which shaft is a ratchet-wheel $i^6$ and drum $i^7$, the ratchet-wheel being arranged in position as described of the ratchet-wheel $i^3$ in shaft I'.

On the opposite longitudinal edge of the table C to that having rack H and at the forward end of said table is a toothed rack H', which is precisely the same in construction as the rack H and arranged to contact with the ratchet-wheel $i^6$ in like manner.

Upon the frame I is a pawl $i^8$, which is the same as pawl $i^4$ in frame I, which pawls $i^4$ $i^8$ control the respective drums $i^3$ $i^7$, as further explained in the automatic action of the devices removing or separating the slimes from the metals on the table C.

Directly above the forward ends $b\ b$ of the track-rails B B and supported in an elevated position above and in a vertical line with the center or guide rail B' are the distributing and irrigating devices for the manipulation of the milled ores, which consist of a main receptacle or trough K, the sides $k\ k$ of which incline inwardly, forming a V-shaped receptacle, the bottom $k^2$ of which is narrow in width and provided with a series of perforations $k^3$ at equal distances apart in the longitudinal direction of the said bottom. The upper longitudinal edges of the stationary trough K are secured to the under side of the transverse ceiling-beams L L of the building by means of the straps I I, secured to the under side of said beams and extending downwardly and connected with the sides $k\ k$ of the trough or receptacle K.

Figures 8, 9, 10, 10A, 11, 12:
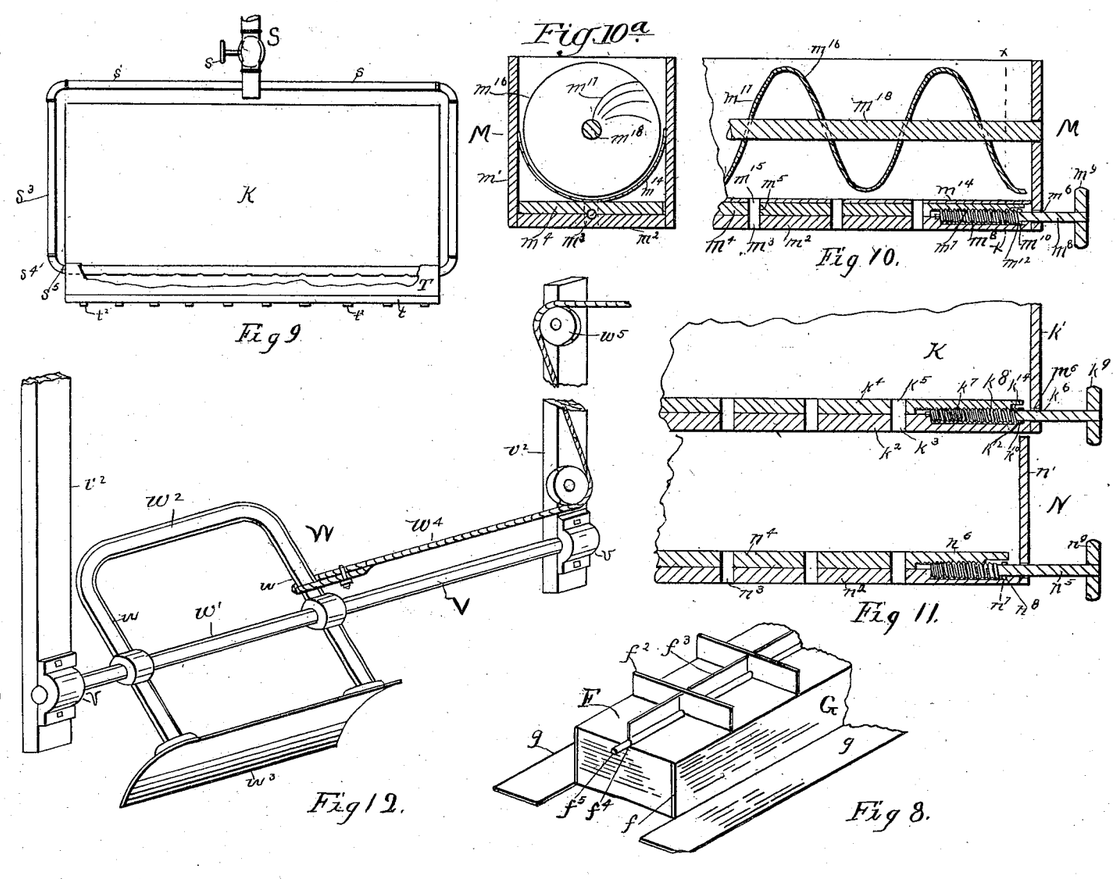

Within the receptacle K and upon the bottom $k^2$ is a longitudinal feed-regulating plate $k^4$, which is shorter in length than the bottom $b^2$, as seen in detail in Fig. 11, so as to be moved lengthwise a short distance. In the plate $k^4$ are the series of perforations $k^5$, which are spaced apart so as to register when required with the perforations $k^3$ in the bottom $k^2$ of receptacle K. In the rear end $k'$ of the receptacle K, in line with the upper surface of the bottom $k^2$, is an opening $k^6$. In the under surface of the rear end of the feed-regulating plate $k^4$ is a threaded depression $k^7$, extending a short distance lengthwise the said plate above the opening $k'$ and conforming to the threads of a screw. In the opening $k^6$ is extended one end of a screw-threaded rod $k^8$, which enters the threaded depressions $k^7$ and having a collar $k^{10}$, which extends within a depression $k^{12}$ in the upper surface of the bottom $k^2$, by means of which the plate $k^3$ is moved so as to cause the registering perforations to be opened in a large or small degree for the passage of the milled ore. The under side and rear end of plate $k^4$ is recessed at $k^{14}$ to pass over the collar $k^{12}$. Upon the outer end of rod $k^8$ is a hand-wheel $k^9$.

In the upper open portion of the receptacle K is a longitudinal trough M, narrow in width and provided with vertical sides $m'\ m'$ and a bottom $m^2$, which is provided with perforations $m^3$, spaced apart in the longitudinal direction of the said trough. In the trough M and upon the bottom $m^2$ is a longitudinal feed-regulating sliding plate $m^4$, which is shorter in length than said bottom and provided with perforations $m^5$, adapted to register with the perforations $m^3$ in the bottom $m^2$. In the rear end $k'$ of the receptacle K and the rear end of trough M is a transverse opening $m^6$, (see Fig. 10,) which is upon a line horizontally with the respective upper and lower surfaces of the bottom $m^2$ and the sliding plate $m^4$, and in the under surface of the plate $m^4$, extending for a considerable distance, are the threaded depressions $m^7$, conforming to the spirals of a screw. In the opening $m^6$ extends one end of a screw-threaded rod $m^8$, which enters the threaded depressions $m^7$, upon the outer end of which rod is a hand-wheel $m^9$. Upon the rod $m^6$, adjacent to the inner surface of the trough, is a circular collar $m^{10}$, which enters a depression $m^{12}$ in the bottom $m^2$ of the trough, whereby in the rotation of the rod $m^8$ the longitudinal movement is arrested and the sliding plate $m^4$ moved sufficiently to wholly or partially close the openings $m^3\ m^3$.

In the bottom of the trough M above the feed-regulating plate $m^4$ is a longitudinal false bottom $m^{14}$, semicircular in cross-section and provided with perforations $m^{15}$ in a vertical line with the perforations $m^3$ in the bottom $m^2$. The opposite ends of trough M are connected rigidly with the inner surface of the respective ends $k'\ k'$ of the receptacle K. At the rear end of trough M is a hopper M', V-shaped in cross-section, the sides $m^\times\ m^\times$ of which are inclined inwardly and connected rigidly with the upper edges of the trough M. Within the false bottom $m^{14}$ of trough M is a longitudinal screw conveyer $m^{16}$, composed of the spiral flange $m^{17}$, extending around a longitudinal shaft $m^{18}$, one end of which shaft extends through the forward end $k'$ of receptacle K, and upon said end is a bevel-gear $m^{19}$. The other end of shaft $m^{18}$ is journaled in the rear end $k'$ of the receptacle K. In the forward side and at the bottom of hopper M' is an opening $m^{20}$ for the passage of the milled ore to the screw conveyer.

Figure 1:
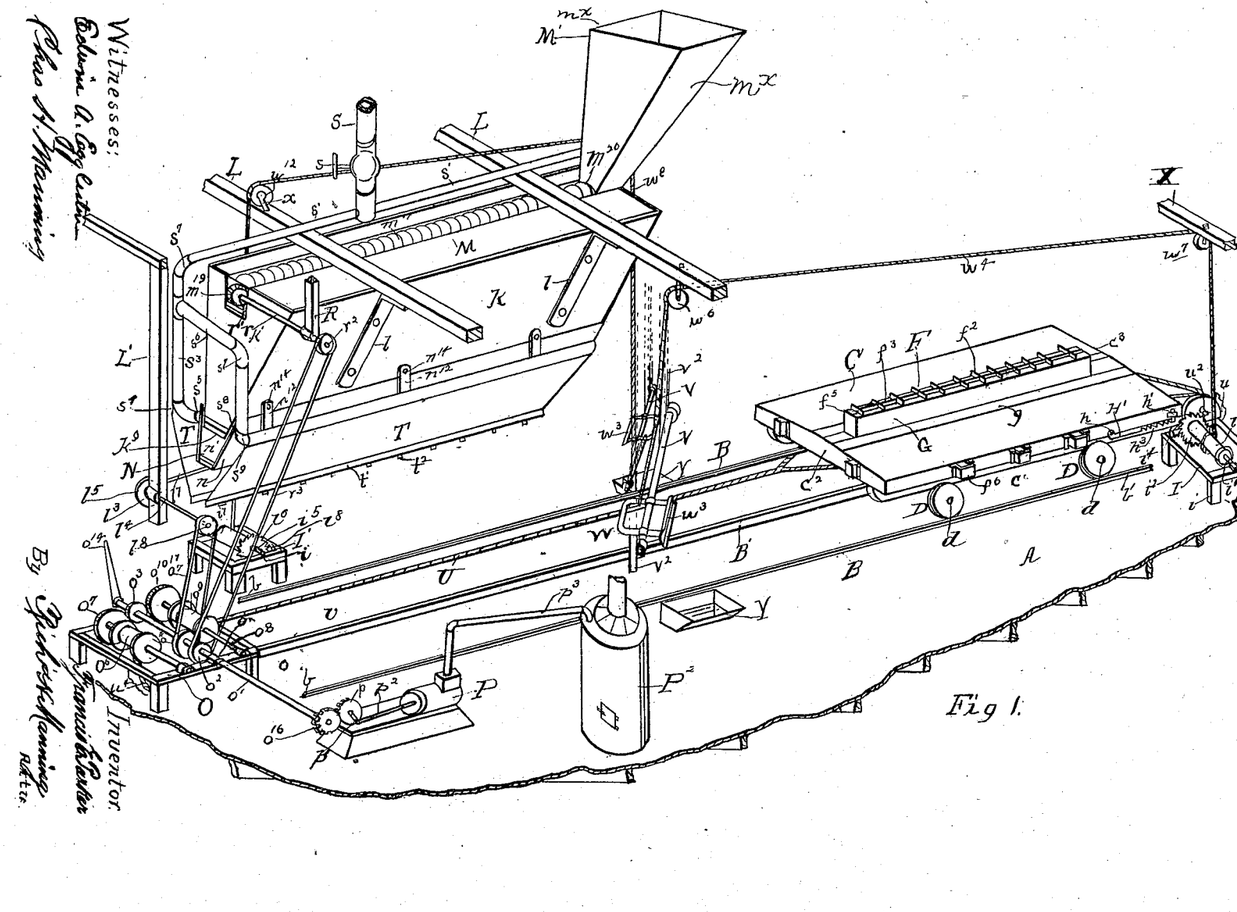
Figure 1 is a view in perspective, showing the elevated conveying, distributing, and irrigating devices for the comminuted or milled ore, the reciprocating table for the concentration and separation of the metals from the waste material mounted on the three track-rails, the mechanism operating the material-dispersing devices automatically, the engine, and mechanism actuated by the engine for reciprocating the table and actuating the distributing and conveying devices for the comminuted ore.
Figure 2:
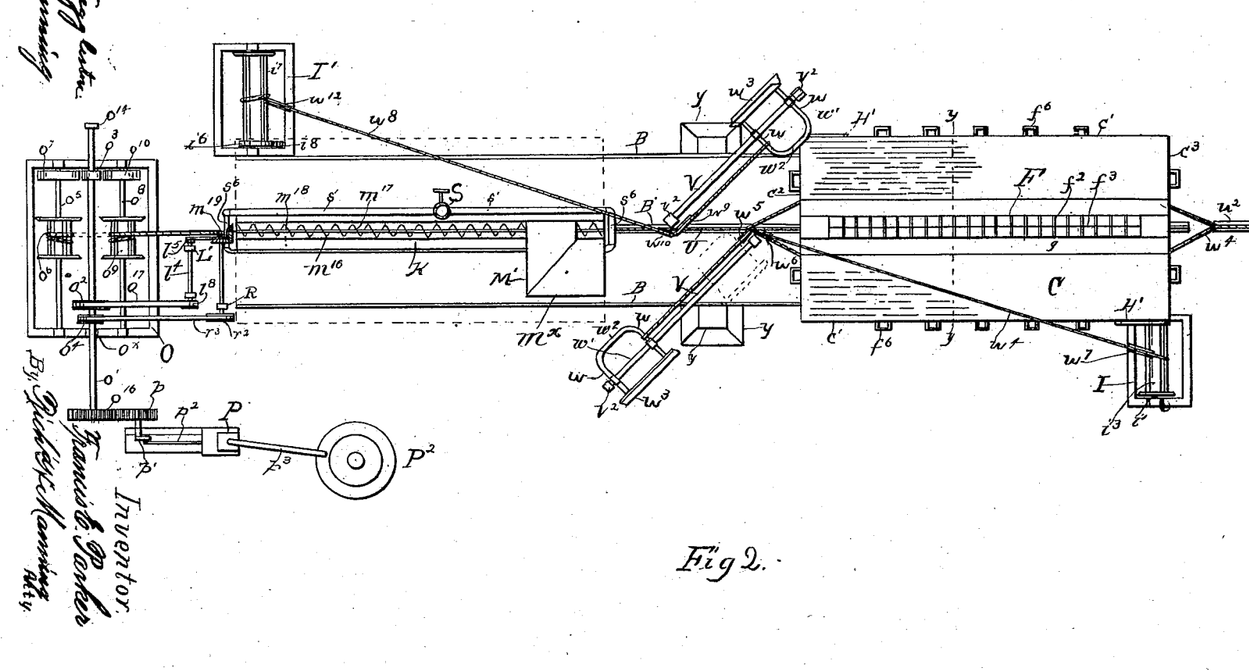
Fig. 2 is a plan view of the invention as seen in Fig. 1.

Beneath the receptacle K is the suspended vibrating trough or receptacle N, having sides $n\ n$ and ends $n'\ n'$ and bottom $n^2$, the upper longitudinal portion of the sides $n\ n$ of which are adjacent to and parallel with the lower portions of the sides $k\ k$ of receptacle K, the lower edges of said sides $n\ n$ extending downwardly to a position a short distance below the horizontal line of the bottom $k^2$ of the receptacle or trough K and are inclined inwardly corresponding to the inclination of the sides $k\ k$ of said receptacle. The ends $n'\ n'$ of the vibrating trough, which conform to the inclination of the sides $n\ n$, extend upwardly to within a short distance of the bottom $k^4$ of the receptacle K, so as to afford a clearance in vibration, as shown in Fig. 1. In the bottom $n^2$ of the trough or sifter N are a series of perforations $n^3$, spaced apart in the longitudinal direction of the said bottom, and upon the under surface of the bottom is a perforate feed-regulating plate $n^4$. The operating-screw $n^5$ extends through the rear end $n'$ of the trough N and engages with the threaded depressions $n^6$ in the under surface of the feed-plate $n^4$ and is provided with a collar $n^7$, secured in a depression $n^8$, and a hand-wheel $n^9$, as described, of the rod $k^3$ in the trough K. To the sides $n$ $n$ of the trough N are pivoted at $n^{10}$, at a point a short distance above the line of the bottom of said trough, the lower ends of a series of suspending-straps $n^{12}$, the upper ends of which straps are pivoted at $n^{14}$ to the sides $k$ $k$ of the receptacle K. On the pivots $n^{14}$ and on the outer surfaces of the receptacle K are washers $n^{15}$. (See Fig. 4.)

The reciprocal movement of the trough N is effected in the following manner: With one of the ceiling-beams L, forwardly from those supporting the receptacle K, is connected the upper end of a hanging beam $L'$, the lower end of which beam extends downwardly in advance of the forward end of the receptacle K and a short distance below a line horizontal with the bottom of the vibrating trough N. Upon the lower end of beam $L'$ is journaled in the box $l^3$ a transverse shaft $l^4$, upon one end of which shaft is a wheel $l^5$, upon which is a crank wrist-pin $l^6$, with which pin is pivotally connected one end of a crank-rod $l^7$, the other end being connected with the under surface of the bottom of the trough N. Upon the other end of shaft $l^4$ is a band-wheel $l^8$.

Upon the floor A at the forward end of the track-rails B B, below beam $L'$, is a rectangular shaft support or frame O, supported by the legs $o$ $o$ at each end, upon which is journaled at a point equidistant from the sides of the frame in the box $o^\times$ a power-driven shaft $o'$, carrying the band-wheels $o^2$ $o^4$ and a small friction-wheel $o^3$, over which band-wheel $o^4$ extends a belt $o^7$, which belt extends over the band-wheel $l^8$ on the shaft $l^4$ on beam $L'$ and the lower ends connected together in the usual manner. The rear end of shaft $o'$ extends beyond the rear end of frame O and is movable laterally a slight distance in the journal-box $o^\times$. Upon frame O in a forward direction from the shaft $o'$ is journaled the shaft $o^5$, carrying the drum $o^6$ and a large friction-wheel $o^7$. Upon the frame O in a rearward direction from shaft $o'$ are journaled the opposite ends of a shaft $o^8$, carrying a drum $o^9$ and a large friction-wheel $o^{10}$. Upon the rear end of shaft $o'$ is a hand-lever $o^{14}$. Upon the forward end of shaft $o'$ is a gear-wheel $o^{16}$.

P represents an engine on floor A and beyond the outer rail B, upon the end of which is a gear-wheel $p$, having a crank wrist-pin $p'$, connected with the pitman $p^2$ of the engine. The gear $o^{16}$ on the shaft $o'$ is caused to mesh with the gear $p$ and transmit power to shaft $o'$. $P^2$ represents the boiler, connected by steam-pipe $p^3$ with the engine.

Connected with one of the overhead or ceiling beams L is a shaft-hanger R, upon which is journaled a horizontal shaft $r$, which extends transversely to the forward end $k'$ of the receptacle K upon a line at right angles to the outer end of the conveyer-shaft $m^{18}$, upon the rear end of which shaft is a bevel-gear $r'$, meshing with the bevel-gear $m^{19}$ on the conveyer-shaft. Upon the forward end of shaft $r$ is a band-wheel $r^2$. Over the band-wheel $r^2$ extends a belt $r^3$, which belt extends over the band-wheel $o^2$ on shaft $o'$.

S represents the main supply-pipe for irrigating the material and which is located above the ceiling-beams L L and rearwardly of a vertical line extending past the rear side of the receptacle K and also equidistant from vertical lines extending past the ends of said receptacle. The pipe S is connected with any suitable source of water-supply and is provided with a globe-valve $s$ and closed at its lower end. With the opposite sides and at the lower end of pipe S is connected the inner ends of the water-distributing pipes $s'$ $s'$, which extend horizontally in opposite directions to a position a short distance beyond the lines of the ends of receptacle K, and with their outer ends are connected the pipes $s^3$ $s^3$, which extend downwardly to a position adjacent to the ends of the vibrating receptacle N, and upon said lower ends of the separate pipes are elbows $s^4$ $s^4$, with which are connected the opposite ends of a horizontal pipe $s^5$, extending in a horizontal direction and opposite the lower portion of the rear side of the vibrating receptacle N and perforated at $s^{10}$ in the under side. With the downwardly-extended ends $s^3$ $s^3$ of the pipes $s'$ $s'$, at a point a short distance below the upper ends of the pipes $s^3$ $s^3$, are connected the ends of branch pipes $s^6$ $s^6$, which extend along the ends $k'$ $k'$ of receptacle K and are bent at right angles at $s^7$ $s^7$ and extended downwardly and provided with the elbows $s^8$ $s^8$, with which are connected the opposite ends of a horizontal pipe $s^9$, which extends longitudinally with the forward side of the vibrating receptacle N and in a parallel plane with the pipe $s^5$ and is perforated upon its under side at $s^{10}$. From the pipes $s^5$ $s^9$ extend downwardly the material-deflectors T T, which consist of longitudinally-extended plates, the upper longitudinal edges of which are bent or looped over the upper surfaces of the pipes $s^5$ $s^9$. The lower ends of plates T T are inclined inwardly at opposing angles and extended downwardly to a position relatively a short distance above the table F on the reciprocating table C when said table is moved in a position beneath the irrigating and material-feeding devices. The lower edges $t'$ $t'$ of plates T T are bent outwardly from the inclined plane of said plates and extended a slight distance downwardly in vertical planes. The plates T T are retained from spreading apart by the cross-braces $t^2 t^2$ on the lower edges of the portions $t' t'$ of said plates.

Figure 3:
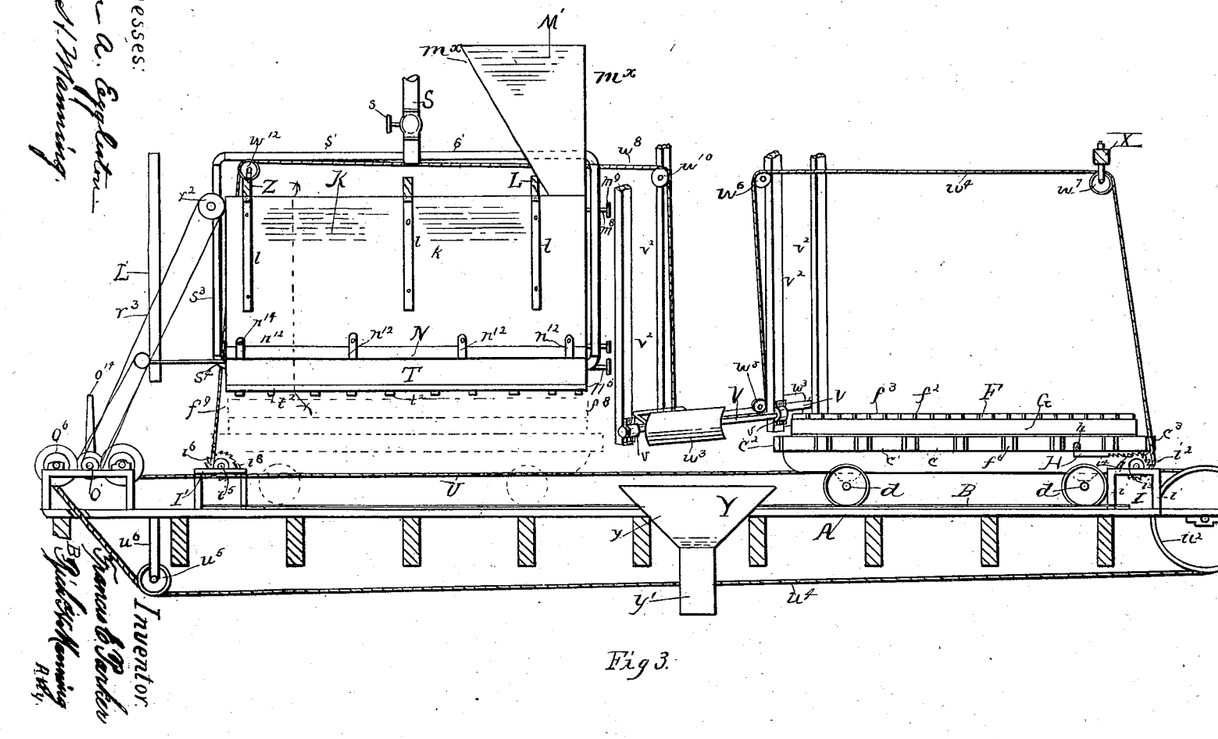
Fig. 3 is a side view in elevation of the invention with the engine removed, showing the position of the reciprocating table in dotted lines for the reception and concentration of the milled ores.

For the purpose of moving the table C to the forward ends $b\ b$ of the track-rails beneath the receptacle K and also to the rear ends $b'\ b'$ of the track-rails alternately a cable U is connected at one end with the forward end of the table C, the other end of which cable is connected with the drum $o^9$ on the shaft $o^8$ on the stationary frame O and which is alternately wound and unwound as the drum is actuated. In the floor A, at the rear end of the guide-rail B', is an opening $u$, in which is located a large cable-pulley $u^2$, (see Fig. 3,) the axis of which is journaled in suitable bearings $u^3$ on the under surface of the floor. With the rear end of table C is connected one end of a separate cable $u^4$, the other end of which cable is passed over the pulley $u^2$, thence beneath the floor A in the direction of the rear ends of the track-rails B B, thence extended over a guide-pulley $u^5$, supported from a hanger $u^6$ on the under surface of floor A, thence extended upwardly through the floor A and connected with the drum $o^6$ on the shaft $o^5$ on frame O, upon which the cable is wound and unwound alternately.

For the purpose of removing the slimes from the concentrates on table C automatically separately-actuated scraping devices are arranged in a position at a point intermediate the vertical plane of the rear ends of distributing and irrigating devices and the table C when in position at the rear end of the track-rails B B and in the plane of the inclined surfaces of said table. These devices consist of separate guide-bars V V, arranged obliquely to the longitudinal plane of the table C above the track-rails B B and a short distance relatively above the plane inclined surface of said table on opposite sides of the concentrating-table F. The guide-bars V V are also arranged in parallel planes with each other and at a proper distance apart and inclined at their outer ends in the same planes as the surface of the table and are held fixedly at their respective opposite ends by the straps $v\ v$ on the lower ends of the hanging beams or shaft-hangers $v^2\ v^2\ v^2\ v^2$, which are connected at their upper ends with the transverse ceiling-beams L L. Upon each guide-bar V is a slidable yoke-frame W, composed of transverse bars or arms $w\ w$, secured loosely thereto by the straps $w'\ w'$. The ends of the arms $w\ w$ on each guide-bar, extending from the guide-bars V V inwardly, are connected with each other by the transverse bar $w^2$, which forms a handle by which the frames may be controlled. Upon the other ends of the arms $w\ w$ on each guide-bar is connected the scraper $w^3$, the convex side of the plate being connected rigidly with the ends of the arms $w\ w$ and arranged with the ends of the plate in nearly a vertical position. The convex plates $w^3$ are of the proper length to extend over the inclined surface of table C on each side of the metal-concentrating table F and remove the slimes. With one of the arms $w$ in the direction of the inner end of guide-bar V is connected one end of a cable $w^4$, the other end of which cable extends parallel with and in the direction of said inner end of guide-bar V and over a pulley $w^5$, located on the hanging beam directly above said inner end of bar V, thence extended upwardly over a pulley $w^6$ on the same beam near its inner end and above the pulley $w^5$, thence horizontally in the direction of a horizontal beam X above the frame I at the rear end of track-rail B and over a pulley $w^7$ on the said beam X, thence downwardly and connected with the drum $i^3$ on the shaft $i'$ on frame I, around which the cable is alternately wound and unwound. With the arm of the other frame W, toward the inner end of guide-bar V, is connected a cable $w^8$, which cable extends over a pulley $w^9$ on the lower end of the hanging beam $w^2$, supporting the inner end of the guide-bar, thence extended upwardly and over a pulley $w^{10}$ on the ceiling-beam L, thence obliquely to the receptacle K over said beam L over a guide-pulley $w^{12}$ on the ceiling-beam L, which supports the forward end of the receptacle K, thence extended downwardly and connected with the drum $i^7$ on the frame I', upon which the cable is wound and unwound alternately.

Y Y represent the discharge-chutes for the slimes from table C, which are located adjacent to the inner and outer track-rails B B beneath the respective convex plates $w^3\ w^3$, so as to receive the slimes removed from the table C. The lower ends $y'$ of chutes Y Y extend through the floor A, and the upper ends above the line of the surface of the floor are outwardly flaring, as at $y$, the waste or slimes from the table C passing through the chute to a dump beneath the floor A.

In the operation of the invention power from the engine P is transmitted through the shaft $o'$ on the stationary frame O, which is transmitted through the belt $r^3$ to the horizontal shaft $r$ and to the conveyer-shaft $m^{16}$ through the bevel-gear $r'$ and $m^{19}$. From shaft $o'$ power is transmitted through the belt $o^7$ to the horizontal shaft $l^4$ and to the vibrating trough or sifter N through the crank-rod $l^7$ and the sifter N set in motion. The hand-lever $o^{14}$ on the rear end of shaft $o'$ is operated to move the small friction-wheel $o^3$ in contact with the friction-wheel $o^{10}$, which rotates the drum $o^9$, winding the cable U thereon and drawing the table C forward on the track-rails B B to the forward end of the track beneath the receptacle K and the material-deflecting plates T T, the concentrating-table F on the table C in this position being directly beneath the vertically-disposed lower ends $t'\ t'$ of said plates. During the time in which the table C is beneath the receptacle K the removable drop sides and ends $f^8\ f^9$ are placed in position on the sides and ends of the table C, so as to hold the body of the irrigated milled ore, and the material may then be sufficiently irrigated to effect the complete separation of the concentrates from the slimes. Before the completion of the forward movement of the table C the frames W W on the guide-bars V V, carrying the convex scrapers $w^3$, are moved on the guide-bars V V by hand to a position near the outer ends of said guide-bars and beyond the path of table C, taking up the slack in the cables connected at the outer ends with the drums $i^3$ $i^7$ on the stationary frames I I'. The hand-wheel on the rod $m^8$ at the rear end of the conveyer-box N is then operated to partially close the registering openings $m^3$ $m^5$ in the feed-regulating slide $m^4$ and the bottom $m^2$ of the conveyer-box M. The ore from which metals are to be separated and as usually mined is first thoroughly pulverized in the usual roller-milling or stamp-mill and reduced to a degree of fineness requisite for the complete separation of the metals. The milled or comminuted ores, consisting of the silicious and mineral constituents with which the metals are intermixed, is fed or delivered in suitable quantity to the hopper M' in the conveyer trough or box M and carried by the conveyer the full length of the trough and percolates or falls by gravity through the partially-open perforations $m^3$ $m^5$ in the trough in regulated quantity into the receptacle or trough K upon the feed-regulating plate $k^2$, which is adjusted in position by the hand-wheel $k^9$, so as to partially close the registering perforations $k^3$ in the feed-plate $k^4$ and the opening $k^3$ in the bottom $k^2$ of the receptacle K, and the fine milled ore passes in regulated quantity by gravity through said perforations into the vibrating reciprocating trough or sifter N and falls upon the perforate feed-regulating slide-plate $n^4$, which is adjusted to partially close the perforations $n^3$ in the bottom $n^2$ of the trough and is sifted through said openings in the space between the deflecting-plates T T and directed by the flange $t'$, so as to fall upon the surface of the concentrating-table F on the table C in position beneath the plates T T. In the sifting of the comminuted ores from the vibrating receptacle N the agitation of the material is effected with the least possible wear on the perforate sliding or feed-registering plates. The globe-valve $s$ in the pipe S is then opened, which admits the water to pass through the perforate pipes $s'$ $s'$ in opposite directions, which passes downwardly through the pipes $s^3$ $s^3$ within the horizontal pipes $s^5$ $s^9$ with considerable force, and during the fall of the comminuted material the water entering the said pipes $s^5$ $s^9$ from opposite ends exerts uniform pressure the length of said pipes and falls upon the inner surface of the plates T T, forming sheets of water which are deflected toward each other and the falling material, and as the material passes through the water a saturation of the material is effected and before it reaches the table F passes between the lower edges $t'$ $t'$ of the plates T T. The table C is supplied with water emitted through the perforate pipes $s^5$ $s^9$, which water is retained by the drop sides $f^8$ and ends $f^9$, which hold the water to a large extent during the concentration. As the sifted material falls saturated with the water the lighter substance of the ores will flow with the water and the gold will fall immediately upon the concentrating-table F and upon the sides of the table upon the mercury of the amalgamating-plates G, which extend outwardly sufficiently to receive the accumulation of metals on either side of table F, and as the material accumulates upon any one portion of the surface of the table between the transverse plates $f^2$ $f^2$ on table F the adjustable plates $f^3$ are inclined at a suitable angle to the surface of the table to deflect the fall of the metals upon the amalgamating-plates. The water which holds in suspension a large amount of the waste material or slimes is constantly effecting a separation during the time the milled ore is being sifted upon the table F, and as soon as the separated metals and slimes have accumulated, so as to afford a load upon table C, the belts $o^7$ $r^3$ are thrown off the band-wheels $o^4$ $o^2$ and the action of the feeding mechanism delivering the milled ore to its table ceases. The globe-valve is then operated to shut off the supply of water to pipes $s'$ $s'$. The sides $f^8$ $f^9$ of the table C are then removed, leaving the slimes accumulated on the inclined surface, the metals remaining upon the amalgam-plates G. The lever $o^{14}$ on the shaft $o'$ is operated to move the small friction-wheel $o^3$ in contact with the friction-wheel $o^7$ on shaft $o^5$, and the cable $u^4$ is wound on drum $o^6$ in the stationary frame O, and the table is moved rearwardly on the track-rails B B to the rear end of said rails. As soon as the rear end of table C reaches the position opposite the ratchet-wheel $i^2$ the rack H engages with the said wheel, causing a partial rotation of the drum $i^3$ and winding the slack of cable $w^4$, operating the frame W, carrying scraper $w^3$, sufficiently to move the scraper on guide-bar V a short distance in the direction of the inner end of said guide-bar. The friction-wheel $o^5$ on shaft $o'$ is then brought into contact with the friction-wheel $o^{10}$ on frame O, and the cable U is again wound upon drum $o^9$ and the table C moved forward in the direction of the drum, the teeth $h^3$ on the rack N slipping from the teeth of the ratchet-wheel $i^3$ on the stationary frame I. In the forward movement of table C the frame W is tilted by the hand and the scraper meets the slimes on the inclined surface of the table C near the longitudinal edge of the table and removes one furrow of the slimes, which falls into the chute Y in the floor A. As soon as the table C in its forward movement reaches the forward ends of the track-rails the rack on the forward end of table C engages with the ratchet-wheel $i^6$ on the frame I', and the drum $i^7$ takes up the slack sufficiently to move the scraper-frame W, which is upon the guide-bar V on the corresponding side of the track-rails, a short distance in the direction of the inner end of said guide-bar V. The table C is then moved rearwardly, the rack slipping from the ratchet-wheel $i^6$ and the surface of the table on the rear side of the concentrating-table presented to the action of the scraper $w^3$ and a furrow of the slimes removed. The reciprocal movement of the table is then repeated in the manner described, and in each forward and backward movement the drums are actuated to wind the cable actuating the scrapers, which move inwardly, removing the furrows alternately on opposite sides of the concentrating-table F and over an increased width of the surface in the direction of the said table until the slimes are wholly removed and the position of the concentrates is reached. The concentrates are then removed from the table C and placed in suitable bins or receptacles for shipment to the reduction plant. The pawls $i^4$ $i^3$ in the stationary frames I I' are then disengaged from the ratchet-wheels, and the frames W W in guide-bars V V are drawn outwardly to the outer ends of said bars, and the drums on the said frames I I' are free to turn. The belts $o^7$ $r^3$ are then replaced on the band-wheels $o^4$ $o^3$, the table C moved beneath the receptacle K, and the milled ore is again delivered to the hopper M' and the operation of the mechanism repeated.

In the manner described large quantities of high or low grade ores may be economically and rapidly separated and nearly all of the metals obtained with an expenditure of a minimum amount of fuel for the production of power required to operate the table C, the load upon which is rapidly moved upon the track, and consequently a large amount of the milled ore can be advantageously treated in a short space of time. In like manner the tailings from the ores which accumulate near all mines can be profitably separated and the valuable metals obtained. The invention is also adapted for the separation of and concentration of silver and lead ores, as well as auriferous ores.

It is obvious that the table C may be reciprocated by equivalent means of propulsion to that of the cable described, or by the ordinary means of car propulsion when found desirable and that mechanism equivalent to that described may be employed to actuate the scrapers without departing from the spirit of the invention and such other modifications employed as are within the scope of the invention.

Having fully described my invention, what I now claim as new, and desire to secure by Letters Patent, is—

1. The combination in separators for comminuted ores, of a longitudinally-extended, elevated, distributing-receptacle, a vibrating sifter beneath said receptacle, and longitudinally-extended, perforate water-supply pipes on each side of the vibrating sifter, and oppositely-inclined water-deflecting plates beneath said perforate pipes and said vibrating sifter.

2. In ore-separators, the combination with a main, elevated, longitudinally-extended receptacle or trough for the reception of the material to be separated, having a perforate bottom and a perforate sliding, feed-regulating plate within and upon the upper surface of the bottom of said receptacle, a perforate material-conveyer box in the main elevated receptacle, means for operating said conveyer, water-spraying pipes on each side of the main receptacle, and suitable water-deflecting plates beneath said pipes.

3. The mechanism for separating metals from comminuted ores, comprising a reciprocally-traveling table, pendent material-removing devices in the path of the upper surface of the table, and suitable hanging supports therefor, and devices actuated alternately by the said table in its to-and-fro movement coacting with the said material-removing devices and imparting an intermittent motion thereto transversely to the line of direction of movement of the table.

4. The mechanism for separating metals from comminuted ores, comprising a reciprocally-traveling table, distributing devices for the comminuted ores, elevated above the plane of the surface of the table, pendent material-removing devices moved transversely to and in the plane of the upper surface of the reciprocating table, and hanging supports for said pendent devices, means for actuating said table in its reciprocal movement, and devices actuated alternately by said table in its to-and-fro movement coacting with the material-removing devices to impart an intermittent movement thereto transversely to the line of direction of movement of the table.

5. The mechanism for removing waste material and slimes from comminuted ores, comprising a suitable table, roller-supports upon said table, and suitable track-rails, guide-bar hangers above the plane of the surface of the moving table and guide-bars connected therewith transverse to the line of direction of movement of said table upon its track-rails, a material-removing, slidable device on said guide-bar, stationary supports upon one side of the track-rails, and a shaft journaled thereon, transverse to the line of the track-rails, a ratchet-wheel on said shaft, a pawl on the stationary shaft-supports, engaging with the ratchet-wheel, a rack on the side of the moving table having self-releasing teeth engaging with the ratchet-wheel, and proper transmitting devices connected with the said shaft and also with the material-removing devices on the guide-bar on the shaft-hangers.

6. The mechanism for removing the waste material and slimes from the comminuted ores, comprising a suitable table, roller-supports therefor and track-rails, guide-bar hangers and fixed supports therefor above the plane of the surface of the moving table, a guide-bar connected at its opposite ends with said hangers at an oblique angle to the length of said table, a scraper adapted to come into contact with the surface of said table, and arms slidably connected with said guide-bars and rigidly connected with said scraper, stationary shaft-supports upon one side of the track-rails, and a shaft journaled on said supports in a transverse direction to the length of the table, and a ratchet-wheel in said shaft, a pawl on said supports, a pivoted rack on the side of the movable table having forwardly-inclined teeth adapted to engage and be disengaged from the ratchet-wheel, a drum on said shaft, suitable pulleys on the hangers carrying the scraper and the fixed supports above the plane of the table above said drum, and a cable connected at one end with the said drum and extending over the said pulleys and connected at the other end with the slidably-connected arms on the guide-bar carrying said scraper.

7. The combination with a movable table for comminuted ores having oppositely-inclined surfaces and roller-supports therefor, and suitable track-rails of guide-bar hangers, and supports therefor above the plane of the surface of the moving table, and separate guide-bars connected with said hangers at an oblique angle to the length of the inclined surfaces of said table, and also inclined at the outer ends in the degree of inclination of the oppositely-inclined surfaces of the table, separate scrapers adapted to come into contact with the said inclined surfaces of the table, and arms slidably connected with the bars on said hangers and rigidly connected with said scrapers, stationary shaft-supports upon opposite sides and near the ends of the track-rails, shafts journaled upon said supports in a transverse direction to the track-rails, ratchet-wheels in said shafts and pawls upon said supports engaging with the ratchet-wheels, pivoted racks on the longitudinal edges and at each end of said table having forwardly-inclined teeth adapted to engage and be disengaged from the teeth of the ratchet-wheels, suitable pulleys on the said hangers supporting said scrapers and upon fixed supports above said hangers, and said shafts carrying said ratchet-wheels, cables connected at one end with said shafts and extending over the said pulleys and connected at the other end with said arms on the respective scrapers, a shaft-supporting frame at the end of the track-rails, and separate shafts on said frame, drums on said shaft, cables connected with separate drums and the alternate ends of the said cable, and means for operating said drums alternately.

8. In ore-concentrating tables, the combination with the main table, of an auxiliary, longitudinally-extended table intermediate the sides of the main table having its sides extended upwardly from the surface of the main table, a series of transverse, upright plates on the surface of the auxiliary table, and a series of longitudinally-extended adjustable plates, the ends of each adjustable plate in said series of plates being adjacent to the sides of the contiguous transverse plates and having its pivoted lower end adjacent to the surface of the auxiliary table.

9. In ore-concentrating tables, the combination with a main table, of an auxiliary, longitudinally-extended ore-separating table intermediate the sides of the main table having its sides extended upwardly from the upper surface of said main table, a series of transverse, upright plates upon the upper surface of the auxiliary table, a rod extending in the longitudinal direction of the auxiliary table through the sides of said transverse plates, and material-deflecting, adjustable plates on said rod.

10. In distributing devices for comminuted ores, a main elevated distributing-receptacle, means for percolating the comminuted ore through said receptacle, horizontal, perforate irrigating-pipes upon the sides of said receptacle, and deflecting-plates connected with said pipes having their lower ends inclined inwardly toward each other, and means for preventing the spreading of said plates.

FRANCIS E. PARKER.

Witnesses:
FRANCIS A. LEACH,
THEODORE C. SPARKS.